July 27, 1926. 1,593,754
C. E. DATH
FRICTION SHOCK ABSORBING MECHANISM
Filed August 22, 1923 2 Sheets-Sheet 1
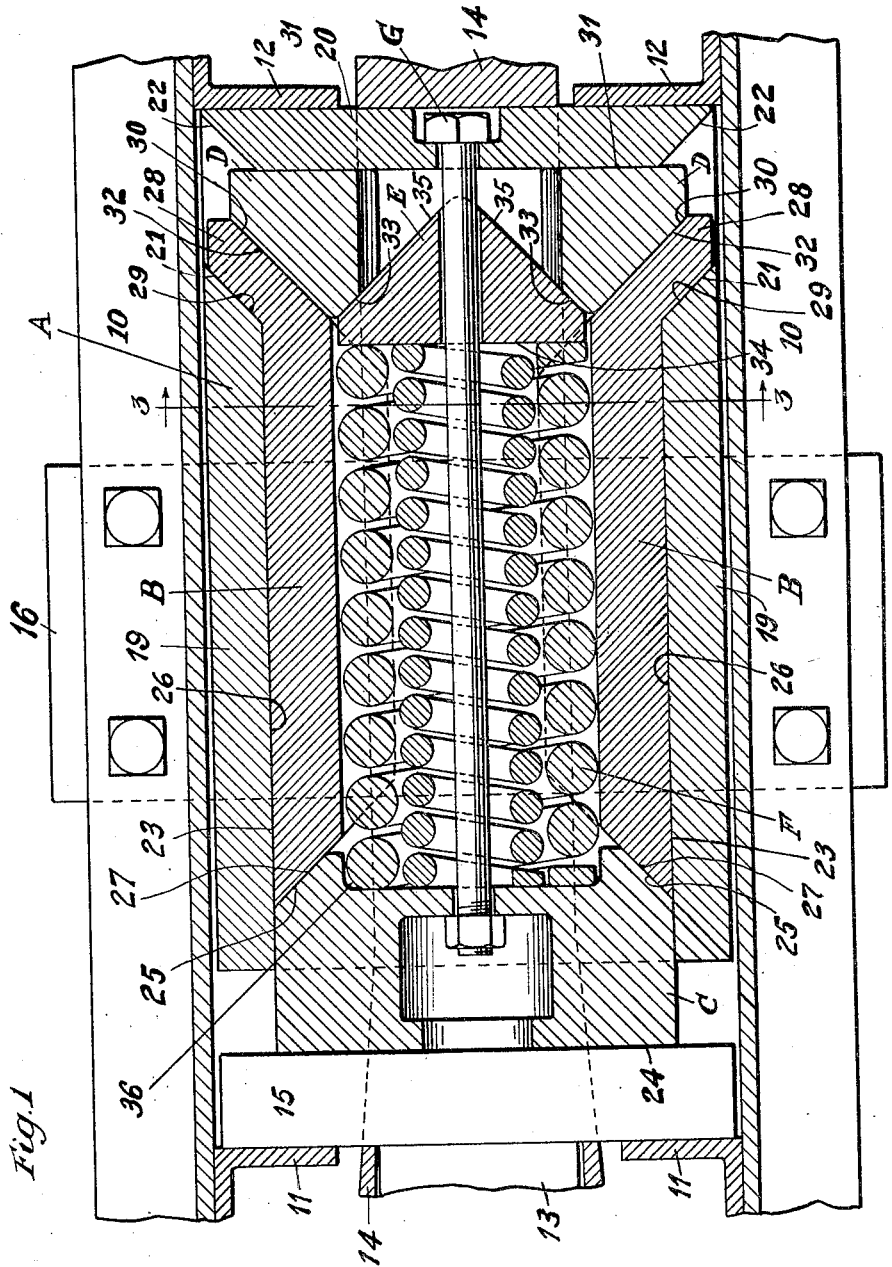
Witnesses
Wm. Geiger
Inventor
Charles E. Dath
By George I. Haight
His Atty.

July 27, 1926.
C. E. DATH
1,593,754
FRICTION SHOCK ABSORBING MECHANISM
Filed August 22, 1923  2 Sheets-Sheet 2
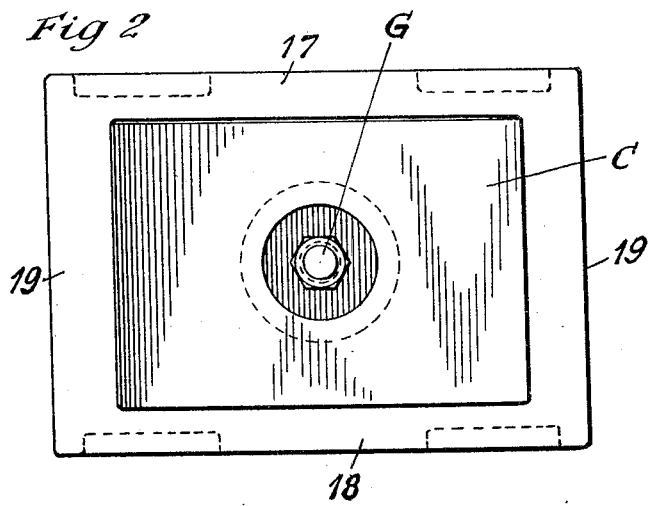
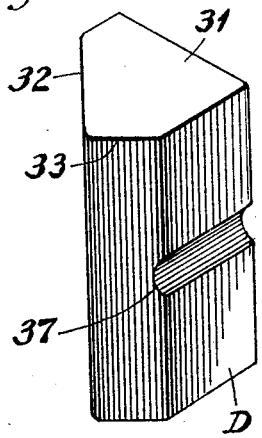
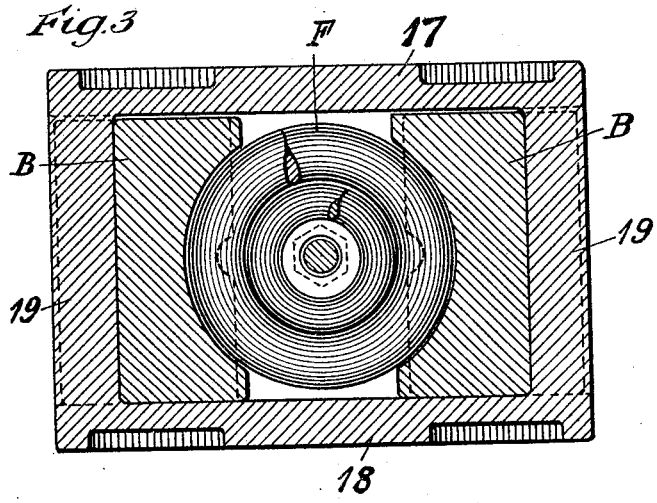
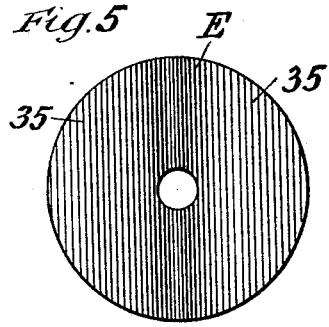
Inventor
Charles E. Dath Patented July 27, 1926.

1,593,754

UNITED STATES PATENT OFFICE.

CHARLES E. DATH, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 22, 1923. Serial No. 658,691.

This invention relates to friction shock-absorbing mechanisms.

One object of the invention is to provide a friction shock absorbing mechanism especially adapted for railway draft riggings, wherein is provided high capacity and certain release.

Another and more specific object of the invention is to provide a friction shock absorbing mechanism of the character indicated, of simple construction, wherein a multiplied or differential action of certain of the friction wedge elements is had, so as to effect a greater spring compression than the actual travel of the actuating element.

In the drawings forming a part of this specification, Fig. 1 is a horizontal, longitudinal, sectional view of a railway draft rigging showing my improvements in connection therewith. Fig. 2 is a front end elevation of the shock absorbing mechanism proper. Fig. 3 is a vertical, transverse, sectional view, corresponding substantially to the line 3—3 of Fig. 1. Fig. 4 is a detailed perspective view of a wedge block used in connection with the improved mechanism. And Fig. 5 is a rear end elevational view of a combined spring seat and wedge used in connection with the mechanism.

In said drawings, 10—10 denote channel center or draft sills of a railway car, to the inner faces of which are secured front stop lugs 11—11 and rear stop lugs 12—12. A portion of the drawbar is indicated at 13, the same being operatively connected with the shock absorbing mechanism proper by a hooded yoke 14. The shock absorbing mechanism is mounted within the yoke 14 as is also a front follower 15. The yoke and parts disposed therein are operatively supported by a detachable saddle plate 16.

The improved shock absorbing mechanism, as shown, comprises, broadly, a combined friction shell and spring cage A; a pair of friction shoes B—B; a pressure transmitting wedge C; a pair of auxiliary wedge blocks D—D; a combined spring seat and wedge E; a spring resistance F; and a retainer bolt G.

The combined friction shell and cage A is preferably in the form of a rectangular casting having spaced top and bottom walls 17 and 18, spaced side walls 19—19 and a rear end wall 20. The end wall 20 is adapted to abut the rear stop lugs 12 and functions as a rear follower. The side walls 19 are shorter than the top and bottom walls and have their rear ends spaced from the rear wall 20 and inclined outwardly and rearwardly thereby providing rearwardly diverging abutment faces 21. The rear wall 20 is cut away at opposite sides to provide rearwardly diverging abutment faces 22 parallel to the faces 21. As best shown in Fig. 1, the side walls 19 are disposed in parallel relation, thereby providing elongated, longitudinally extending friction surfaces 23 extending from end to end thereof.

The pressure transmitting wedge C is in the form of a hollow block having a flat front face 24 adapted to abut the rear face of the follower 15, and a pair of vertically disposed wedge faces 25, converging rearwardly of the mechanism.

The friction shoes B are of like construction and are of such a height vertically, as to slide freely and be guided between the upper and lower walls of the shell. Each of the friction shoes is provided with an elongated, flat, outer side friction surface 26 adapted to co-act with the adjacent friction surface 23 of the shell, and an inner wedge face 27 at the front end thereof correspondingly inclined to and co-acting with the adjacent face 25 of the wedge C. At their rear ends, the shoes B are provided with vertically disposed, lateral extensions 28 diverging rearwardly of the mechanism and inclined to correspond with the faces 21 and 22 of the shell, thereby providing flat front and rear abutment surfaces 29 and 30 correspondingly inclined to faces 21 and 22 and adapted to co-act therewith, each set of faces 21 and 22 being spaced apart a proper distance to allow the necessary movement of the shoes to permit the front follower 15 to engage the outer end of the shell A when the mechanism is fully compressed. The rear faces 30 of the shoes B are adapted to act as wedge faces and cooperate with the auxiliary wedges D, as hereinafter described.

The auxiliary wedges D are in the form of blocks, and are interposed between the rear ends of the shoes B and the rear wall 20 of the shell, being normally disposed in spaced apart relation as clearly shown in Fig. 1. Each of the wedge blocks D is provided with a flat rear face 31 and a pair of vertically disposed, forwardly converging, wedge faces 32 and 33 at the front end thereof. The flat faces 31 of the wedge blocks are adapted to slidingly engage the inner face of the rear wall 20 of the shell, whereby the blocks D are slidingly mounted for lateral movement toward each other. The outer face 32 of each block is relatively longer than the inner face 33 and is correspondingly inclined to and adapted to co-act with the face 30 of the corresponding shoe B.

The combined spring seat and wedge E is provided with a flat front face 34 forming an abutment or seat for the rear ends of the inner and outer coils of the spring resistance F, and a pair of converging rear faces 35, each correspondingly inclined to and adapted to co-act with a face 33 of one of the blocks D.

The spring resistance F is interposed between the combined wedge and spring seat E and the pressure transmitting wedge C, the latter having its rear wall provided with a shallow recess 36 disposed between the wedge faces 25 and adapted to receive the front ends of the inner and outer coils of the spring.

The parts are held in assembled relation and under slight initial compression by the retainer bolt G anchored at its opposite ends in the rear wall 20 of the shell and the wedge block C, respectively, and passing through the center of the spring resistance F and a central perforation in the spring seat E.

The operation of the improved shock absorbing mechanism is as follows, assuming an inward or buffing movement of the drawbar. The front follower 15 will be forced rearwardly, which in turn will force the wedge C in the same direction forcing the shoes B rearwardly and at the same time setting up a wedging action between the latter and the wedges C and D. During the continued rearward movement of the wedge C and the shoes B, the spring resistance F will be compressed directly by the wedge C and the faces 32 at the rear ends of the shoes will slip on the faces 30 of the wedge blocks D forcing the same laterally toward each other thereby moving the combined wedge and spring seat D forwardly due to the action of the wedge faces 33 and 35, further compressing the springs. In actual practice, the parts will preferably be so arranged and proportioned that the compression movement of the spring will be double that of the front follower. The described action will continue until the compression force is relieved or until the front follower and the faces 32 of the shoes engage the outer end of the shell and the faces 32 on the rear wall of the shell, respectively. When the gear has been fully compressed, the wedge blocks D will have their inner side faces disposed slightly spaced apart, the same being provided with longitudinally extending grooves 37 to accommodate the retainer bolt G and permit of this movement.

In release, after removal of the actuating force, the spring F acting directly on the wedge C forces the same outwardly which releases all of the parts, permitting the spring to restore the same to normal position as shown in Fig. 1. Outward movement of the wedge C will be limited by the retainer bolt G.

From the preceding description it will be evident that high combined spring and frictional capacity is obtained due to the differential wedge action and relatively large area of friction surfaces provided. In addition to the large frictional area provided by the co-acting friction surfaces of the shoes and shell, friction is also generated between the inner surface of the rear wall of the shell and the wedge blocks D sliding thereon, and between the wedge faces of the shoes B, wedges D and spring seat E.

I have herein shown and described what I now consider the preferred manner of carrying out the invention, but the same is merely illustrative and I contemplate all changes and modifications that come within the scope of the claim appended hereto.

I claim:—

In a friction shock absorbing mechanism, the combination with a friction shell having a plurality of interior friction surfaces; of a plurality of friction elements co-acting with said shell friction surfaces, said elements having co-acting wedge faces; a wedge pressure transmitting means adapted to engage certain of said elements and move the same longitudinally of the shell thereby moving the remaining elements toward each other transversely of the shell co-operating means on said shell and shoes for limiting outward movement of the latter relatively to the shell; and yielding means opposing movement of said last named elements toward each other.

In witness that I claim the foregoing I have hereunto subscribed my name this 17th day of August, 1923.

CHARLES E. DATH.